United States Patent
Lander et al.

[11] Patent Number: 5,974,862
[45] Date of Patent: *Nov. 2, 1999

[54] METHOD FOR DETECTING LEAKS IN PIPELINES

[75] Inventors: Paul Lander, Lincoln, Mass.; William E. Saltzstein, Woodinville, Wash.

[73] Assignee: Flow Metrix, Inc., Maynard, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 08/852,043

[22] Filed: May 6, 1997

[51] Int. Cl.$^6$ ...................................... G01M 3/24
[52] U.S. Cl. ...................... 73/40.5 A; 364/507; 73/592
[58] Field of Search ................ 73/40.5 A, 587, 73/542; 364/507, 509, 510

[56] References Cited

U.S. PATENT DOCUMENTS

| | | | |
|---|---|---|---|
| 4,083,229 | 4/1978 | Anway | 73/40.5 A |
| 4,289,019 | 9/1981 | Claytor | 73/40.5 A |
| 4,306,446 | 12/1981 | Fukuda | 73/405 R |
| 4,327,576 | 5/1982 | Dickey et al. | 73/40.5 A |
| 4,543,817 | 10/1985 | Sugiyama | 73/40.5 A |
| 4,609,994 | 9/1986 | Bassim et al. | 364/551 |
| 4,779,458 | 10/1988 | Mawardi | 374/41 |
| 4,858,462 | 8/1989 | Coulter et al. | 73/40.5 A |
| 4,958,296 | 9/1990 | Saitoh et al. | 364/509 |
| 5,038,614 | 8/1991 | Bseisu et al. | 73/592 |
| 5,117,676 | 6/1992 | Chang | 73/40.5 A |
| 5,205,173 | 4/1993 | Allen | 73/592 |
| 5,272,646 | 12/1993 | Farmer | 364/509 |
| 5,361,636 | 11/1994 | Farstad et al. | 73/592 |
| 5,416,724 | 5/1995 | Savic | 364/509 |
| 5,531,099 | 7/1996 | Russo | 73/40.5 A |
| 5,544,074 | 8/1996 | Suzuki et al. | 364/508 |

*Primary Examiner*—Michael Brock
*Attorney, Agent, or Firm*—Fish and Richardson; John Hayden

[57] ABSTRACT

The invention relates to detecting leaks in a pipeline using enhanced methods of data sensing, digitally encoded transmission, and cross-correlation. A plurality of acoustic sensors are applied to the pipeline to sense a combination of signals from the leak and much greater quantities of noise. The sensed data is digitized at the sensor, encoded and digitally transmitted to a computerized base station. The encoded data from a plurality of sensors received at the base station is decoded, digitally filtered and cross-correlated. Enhanced methods of cross-correlation are performed to estimate the likely presence of a leak and the location and size of any leaks present. Participation in the leak detection procedure by an expert not present at the pipeline is facilitated by communication of data between the base station and a distant supervisory station.

27 Claims, 16 Drawing Sheets

| Description | ID Code | Data Bytes Sent | Data Bytes Returned | Initiated by: |
|---|---|---|---|---|
| Start Recording [1] | 0x01 | 0 | 0 | Base |
| Stop Recording | 0x80 | 0 | 0 | Base; Remote |
| Program Gain | 0x03 | 1 | 0 | Base; Remote |
| Calibrate A/D | 0x04 | 0 | 0 | Base |
| Reset | 0x05 | 0 | 0 | Base |
| Get Position | 0x06 | 0 | 12 | Base |
| System Test [2] | 0x07 | 0 | 0 | Base |
| Synchronize Radios | 0x08 | 0 | 0 | Base |

[1] Remote unit will send continuous data until Stop command is sent

[2] Remote unit will send a continuous, deterministic test sequence until the Stop command is sent

FIG. 11

METHOD FOR DETECTING LEAKS IN PIPELINES

BACKGROUND—FIELD OF INVENTION

The invention relates to methods of acoustic leak detection, particularly to improving and enhancing such leak detectors which locate a leak by estimating the time delay between the arrival of a vibration signal from a leak at two or more points on a pipeline.

BACKGROUND—DESCRIPTION OF PRIOR ART

It is well-known that an acoustic signal is generated when a leak is present in a pressurized pipeline. The sounds or vibrations associated with the leak are propagated in both directions away from the leak, at a constant velocity. Propagation occurs within the medium flowing in the pipeline and along the pipeline itself. Two sensors, placed on the pipeline on opposite sides of the leak, will sense the leak signal at different times, proportional to their distances from the leak. Conventional leak detectors have each sensor connected to an electronic unit which filters, amplifies, and transmits the received signals in analog form to a base station. At the base station, the signals from two sensors are received and bandpass filtered in analog form. The signals are then digitally sampled. The two sampled signals are then cross-correlated. If a leak is present, a peak appears in the cross-correlation function at time lag, T. U.S. Pat. No. 4,083,229 to Anway discloses a method for finding the position of a leak using cross-correlation performed by specially designed electronic hardware. In this system, the location of the leak can be determined from the lag, T, a knowledge of the distance between the sensors, and a knowledge of the velocity of sound in the pipe. This system has been refined in U.S. Pat. No. 5,205,173 to Allan, but has essentially similar performance.

Other technologies have been employed for detecting leaks in pipelines, including ultrasonic testing of pipe coupling seals—for example, the method disclosed by Farstad (1993) in U.S. Pat. No. 5,361,636, gas emission detectors, liquid emission detectors—for example, the method disclosed by Mawardi in U.S. Pat. No. 4,779,458, and even routine helicopter patrol of longer pipelines. None of these methods provides the benefit of cost-effective, automatic leak detection at a distance, which are potentially offered by acoustic leak detection methods.

Several enhancements have been proposed to enhance sensitivity to small leak signals. U.S. Pat. No. 5,416,724 to Savic (1992) discloses a method of detecting leaks from computed linear predictive coding coefficients. This approach requires multiple sensors, is tuned to one particular pipeline, and does not pinpoint the location of the leak. U.S. Pat. No. 5,272,646 to Farmer (1993) and U.S. Pat. No. 4,609,994 to Bassim (1986) disclose methods of long-term, periodic leak testing. Both methods are tuned to specific pipelines and feature a non-portable apparatus. Portable leak detectors based on cross-correlating leak sounds measured at two locations heretofore known suffer from a number of disadvantages:

(a) Cross-correlation performance is inadequate if there is a low signal-to-noise ratio at the sensor. This occurs if the environment is noisy, precluding leak detection in many environments. The received leak signal will be small if the leak is acoustically quiet, which occurs when the rate of fluid loss at the leak is low, the pressure in the pipe is low, or the leak-sensor distance is great. Plastic pipes damp propagation of the leak signal, attenuating its strength even over short distances. This limits the maximum leak-sensor distance unacceptably in prior art cross-correlators. Correlators at present experience great difficulty in reliably locating leaks under conditions of low signal-to-noise ratio. Leaks may be missed, incorrectly located, or false positive leak detections may occur.

(b) Noise amplitudes, or other characteristics, often vary with time during the cross-correlation measurement. Such variations can easily invalidate the result of the cross-correlation procedure. At poor signal-to-noise ratios, correlation requires a longer measurement time, during which flow conditions in the pipe must be constant. In industrial settings, such as petroleum fueling at airports, and in gas and water pipelines, changing demand will alter the flow rate and pressure in a pipeline, changing the characteristics of the leak signal and distorting the correlation measurement unrecoverably.

(c) The leak component of the received signal is typically very small compared to the noise component. The dynamic range of the received signal (the ratio of the largest measured value to the smallest) is usually very high. Leak detectors presently in use employ automatic gain control which operates independently at each sensor. The variable electronic gain is needed to maximize the dynamic range of the received signal. However, if the electronic gain is changed differently at the two sensors, the cross-correlation process is distorted and no leak can be detected.

(d) Analog radio transmission of received signals from the sensor units to the base station introduces noise, particularly over long ranges, and limits the dynamic range of the received signal. If the ratio of the noise to the leak signal is above the dynamic range of the radio transmission, the leak signal is lost. Transmission noise also distorts the leak signal and may cause cross-correlation to fail to detect a leak. Additionally, each sensor must have an analog radio transmitter tuned to a unique frequency. This reduces the bandwidth available to transmit the signal received at the sensor, limiting the range, bandwidth, and resolution of the received signal. These factors further compromise the signal-to-noise ratio and may result in failure to detect a leak present.

(f) Mechanical accelerometers, using a piezo-electric sensing element, are traditionally used with metal pipes. These accelerometers are capable of detecting small leak sounds but are typically several inches in dimension, weigh up to half a pound, are expensive, and are fragile. They can only be used at suitably-sized access points on a pipeline. This can seriously limit the proximity of sensor placement to the suspected leak, leading to an inadequate signal-to-noise ratio and subsequent failure to detect the leak.

(g) Analog filters are used to restrict the bandwidth of the received signal prior to cross-correlation analysis. Analog filters have a limited number of physically or electronically switchable settings. This limits the precision with which the filtering may be adjusted to enhance leak signals from noise. Additionally, small, unavoidable differences in analog filter characteristics introduce systematic differences between the received signals from the two sensors. The differences may obscure the cross-correlation of the leak signal.

(h) The distance between sensors is measured manually, typically by walking with a measurement wheel. The actual course of a buried pipeline, with turns and changes in depth, may deviate from the distance walked at ground level. An imprecise knowledge of the pipeline length between sensors adds an error to the measurement of the location of any leak detected.

(i) With analog processing and variable gain control, the actual physical size of the received leak signal, in units of gravitational force, is lost in transmission and processing. It is therefore not possible to estimate the size of the leak or its signal strength from the cross-correlation function.

SUMMARY

The invention features detecting and pinpointing the location of leaks in a pipeline. The size of any leaks present is also measured. To this end, the invention includes receiving signals from miniaturized sensors placed on a pipeline in the presence of very small leak signals masked by much greater, possibly varying, noise. The leak detection process is computerized and the need for almost all analog processing is eliminated. A digital signal path is created from the sensor to the display of the cross-correlation result. The digital signal path preserves very small leak signals, minimizes noise, and retains information about the received signal strength, permitting the leak size to be estimated.

Accordingly, several objects and advantages of the present invention are:

(a) To provide an accurate leak detection method at signal-to-noise ratios which are too low for presently used devices to detect and pinpoint the location of any leaks present.

(b) To provide a leak detection method which is immune to the effects of changing noise levels caused either by changing flow characteristics in the pipeline or by changing ambient noise at the sensor.

(c) To provide a leak detection method which is immune to false positive leak detections by statistically verifying the location of each leak detected.

(d) To provide a leak detector with communication capabilities which can be operated remotely at a supervisory station by expert personnel. Interpretation of results is relayed to leak repair personnel physically present at the pipeline.

(e) To provide precise measurement of the distance traveled by an acoustic leak signal between sensors through the pipeline. That is, measurement of the actual propagation distance, as opposed to measuring the distance between sensors by walking adjacent to the pipeline. Precise knowledge of the distance between sensors is needed for precise localization of the leak position. An additional object is to provide a means of finding the position of each sensor by an automatic means built into the leak detection system.

(f) To enhance the signal-to-noise ratio of received signals by providing noise-free radio transmission of the received signals.

(g) To provide significantly enhanced dynamic range in transmitting the received signals. Enhanced dynamic range will preserve small leak signals and enable detection of small leaks.

(h) To provide a low-cost, miniaturized sensor which can be used at pipeline locations that are not presently accessible with conventional sensors.

(i) To store received signals permanently for subsequent re-analysis and for comparison of different leak detection estimates.

(j) To enable estimation of the strength of the leak signal in units of gravitational force. This in turn will enable estimation of the size of the leak.

Further objects and advantages are to provide a leak detector which is simple to use, facilitating increased use by pipeline repair personnel, which is inexpensive to construct and maintain, which is easy to manufacture, which is extensible in mode of operation and capabilities via software programming techniques, which is highly portable, and which is very economic in power consumption, facilitating longer and more efficient continuous use of the device.

BRIEF DESCRIPTION OF THE DRAWING FIGURES

FIG. 11 shows the display of the base station.

REFERENCE NUMERALS IN DRAWINGS

| | | | |
|---|---|---|---|
| 20 | pipeline | 210 | signal analyzer |
| 22 | remote processor | 215 | data storage unit |
| 26 | base station unit | 220 | display unit |
| 31 | strap | 225 | input/output unit |
| 32 | magnet | 230 | communication unit |
| 33 | metal sensor housing | 300 | procedure for analyzing received data |
| 34 | sensor | | |
| 36 | cable from sensor to remote processor | 400 | procedure for proceessing extracted data |
| 37 | integrated accelerometer | 500 | base station display |
| 38 | sensor interface unit | 501 | graphical window |

-continued

| | |
|---|---|
| 39 sensor terminal pins | 502 user controls |
| 40 signal conditioning circuitry | 503 user input options |
| 42 micro-controller | 504 system dialog box |
| 44 remote digital transceiver | 505 vertical axis display element |
| 46 position finder | |
| 48 power unit | 510 horizontal axis display element |
| 100 procedure for processing received signals | 515 true peak in cross-correlation function |
| 170 data packet | |
| 175 data section of data packet | 520 artifactual peak in cross-correlation function |
| 180 header section of data packet | |
| 205 base digital transceiver | 560 threshold in normalized cross-correlation function |
| | 705 noise burst in received data |

Description of the Invention

Overview

Figure 1:
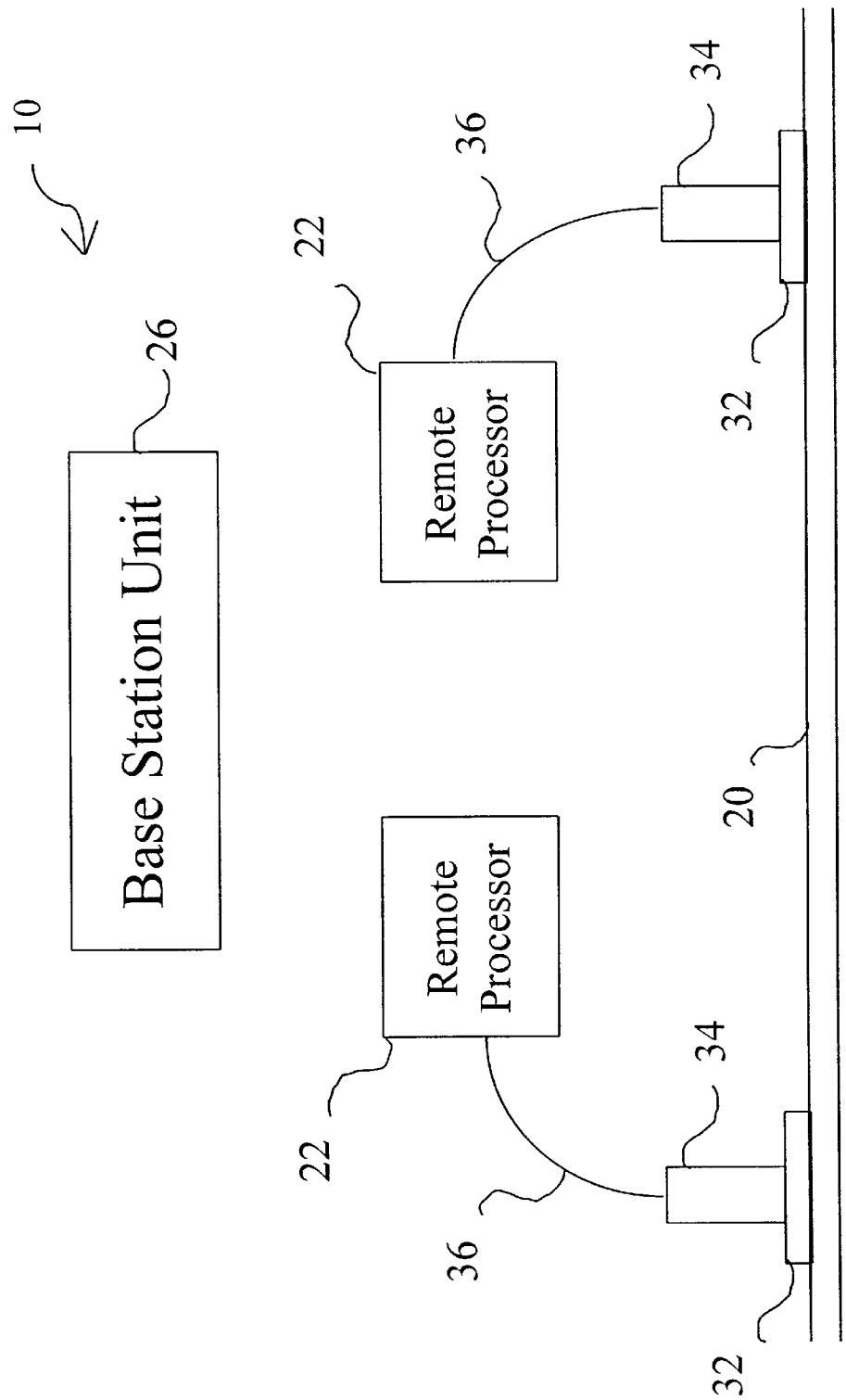
FIG. 1 shows an overview of the major components of the leak detection system.
Figure 2:
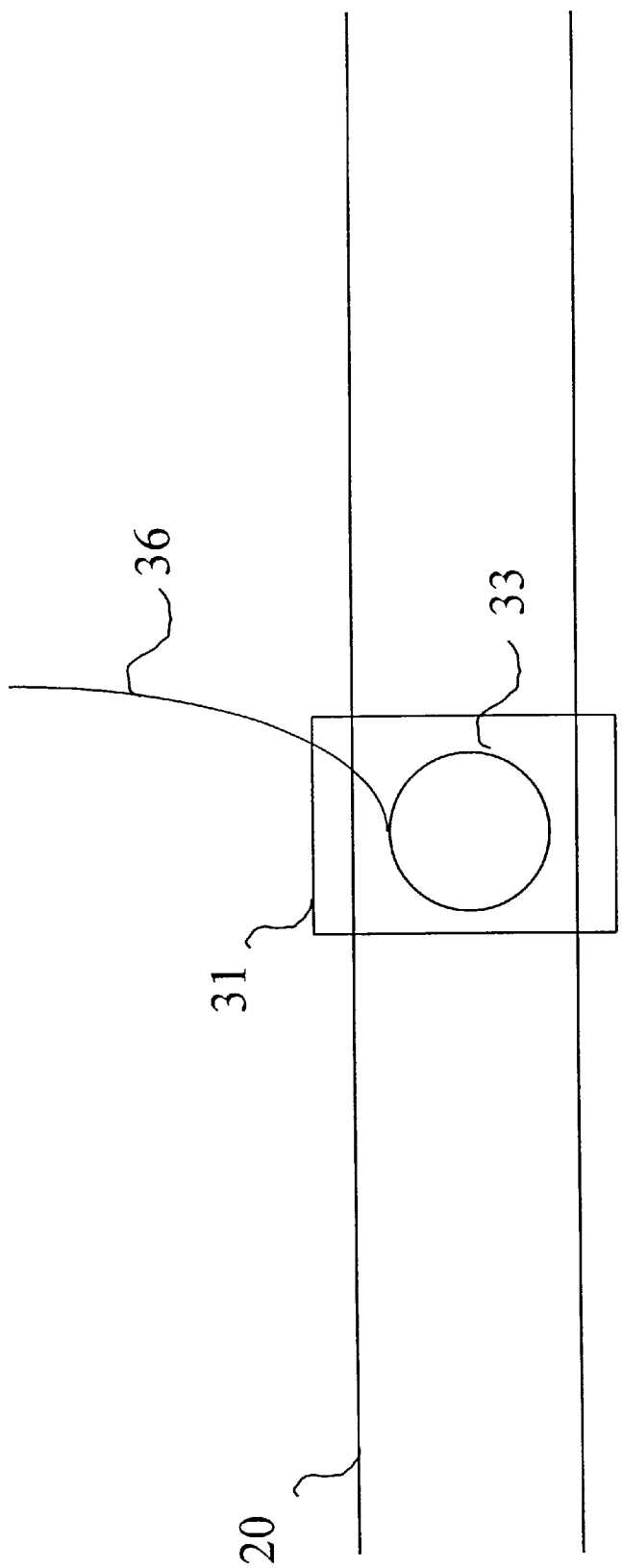
FIG. 2 shows a side view of the integrated accelerometer attached to a pipeline.

Referring to FIG. 1, a leak detection system 10 that may be used to detect the location and size of leaks from a pipeline 20 includes at least two pipeline sensors 34. The sensors may be standard piezo-electric accelerometers, hydrophones, microphones, or may be electronic integrated accelerometers. The accelerometers are attached to a pipeline component, such as a pipe, hydrant or valve using a magnet 32. Referring to FIG. 2, alternatively, for plastic pipes the accelerometers may be affixed using a strap 31. The system further includes sensor cables 36 that connect the sensors to remote processors 22. The remote processors 22 condition the received analog signals, digitize the conditioned signals, encode the digitized signals, and transmit the encoded signals to a base station 26. The base station 26 analyzes the encoded signals to produce an estimate of the location and size of any leaks present in the pipeline 20.

Sensors

Figure 3:
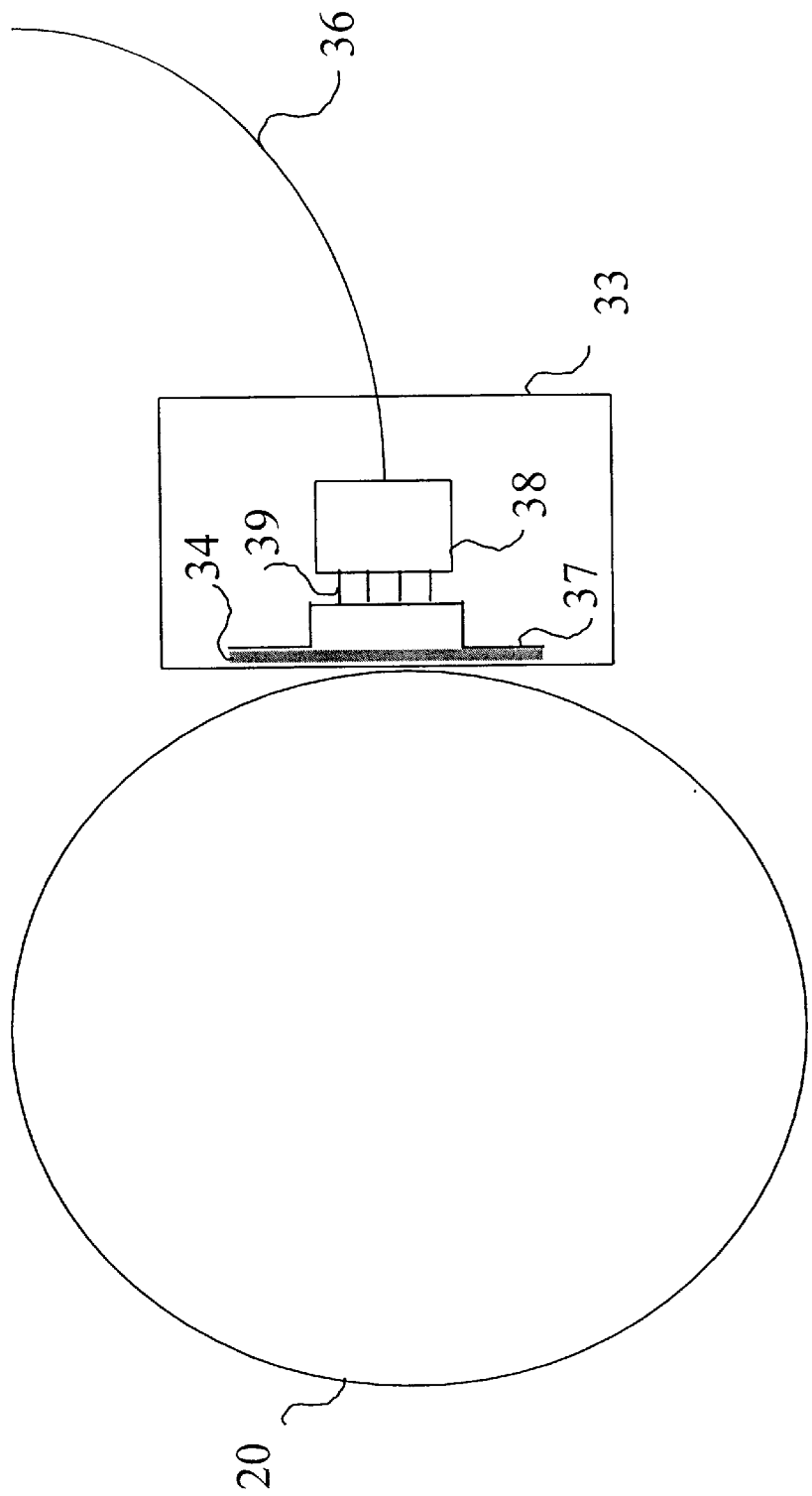
FIG. 3 shows a top view of the integrated accelerometer attached to a pipeline.

Referring to FIG. 3, an electronic integrated accelerometer unit that may be used to receive vibrations from a pipeline system 20 includes an integrated accelerometer 37. The accelerometer is electrically and mechanically connected to an interface unit 38, via its terminal pins 39. The terminal pins 39 provide a zero voltage reference, a signal output and power supply lines of ±12V. The output of the interface unit 38 is connected to the remote processor 22 using a cable 36. The force-sensing side of the accelerometer 37 is attached to a magnet 34. The magnet 34 attaches to the pipeline 20. The entire unit is contained inside a metal housing 33. The housing 33 provides shielding from interference signals, such as electromagnetic fields from power cables in the vicinity of the pipeline. Referring again to FIG. 2, the electronic integrated accelerometer unit may be attached to the pipeline using its magnet or with a strap 31. The strap 31 fits around the housing and holds the housing in rigid contact with the pipeline 20.

Remote Processors

Figure 4:
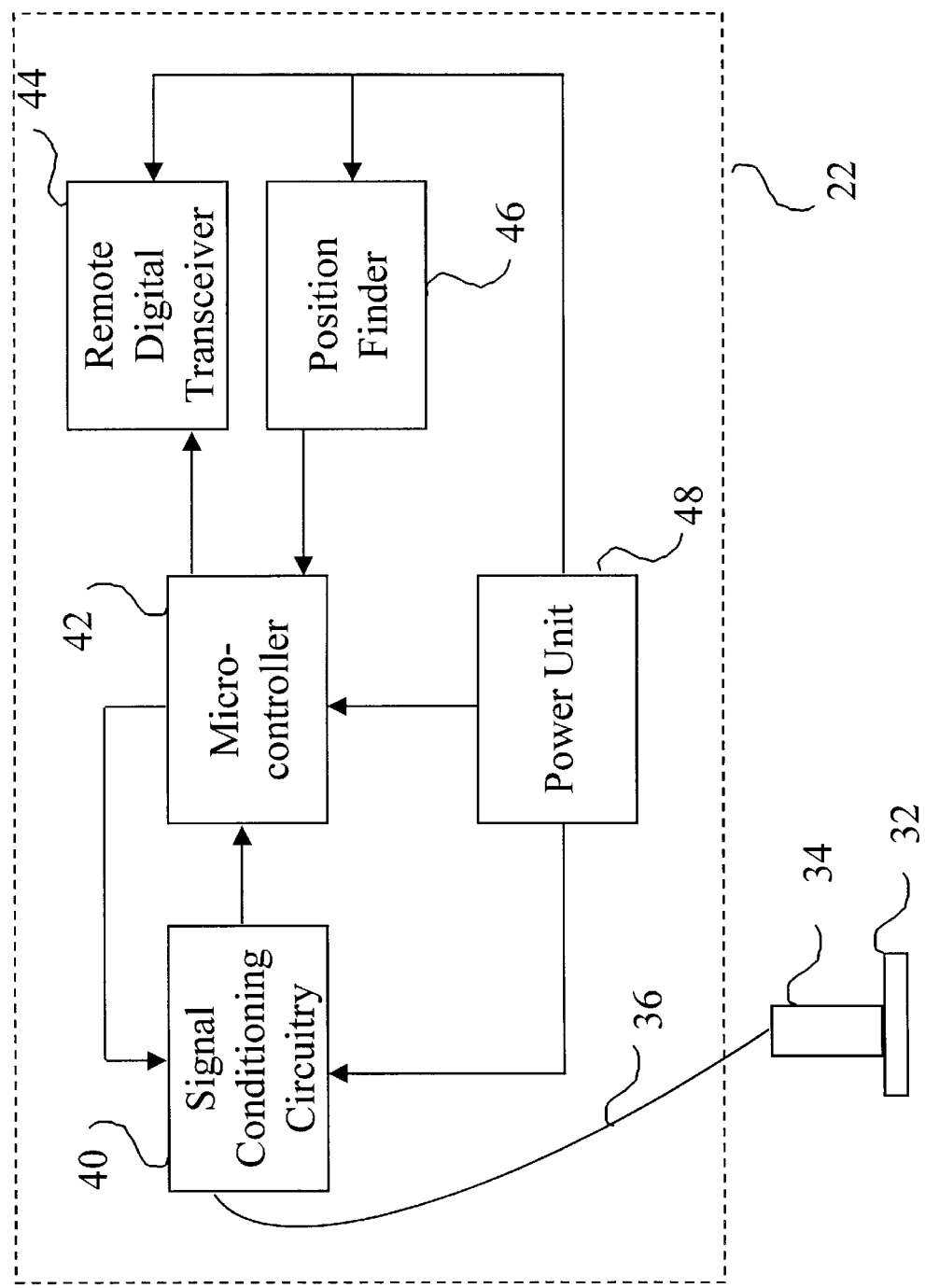
FIG. 4 shows the hardware components of a remote processor.

Referring to FIG. 4, the remote processor receives analog signals via a cable 39 from the sensor 34. The remote processor includes signal conditioning circuitry 40 which conditions the received signal by electronic filtering and electronic gain, and digitizes the conditioned signal. Digitizing is performed at a sampling rate of 5,000 Hz and a resolution of 16 bits. The digitized signal is then input to a micro-controller 42. The micro-controller 42 may adjust the electronic filtering or gain, either by analyzing the digitized signal or by responding to a message received from the base station 26.

The micro-controller then encodes the digitized signal and builds a data packet, including header information and encoded data. The processor 42 outputs the data packet to a digital transceiver 44 for transmission to the base station 26. The digital transceiver 44 is a spread spectrum radio transmitter/receiver configured as a remote transmitting device. Alternatively, the digital transceiver 44 may be a serial transmitter, a network node, or other digital transmission device. The remote processor 22 may optionally include a position finder 46 which detects the geographical position of the remote processor using a satellite-based positioning system. A power unit 48 supplies power to the components of the remote processor 22.

Figure 5:
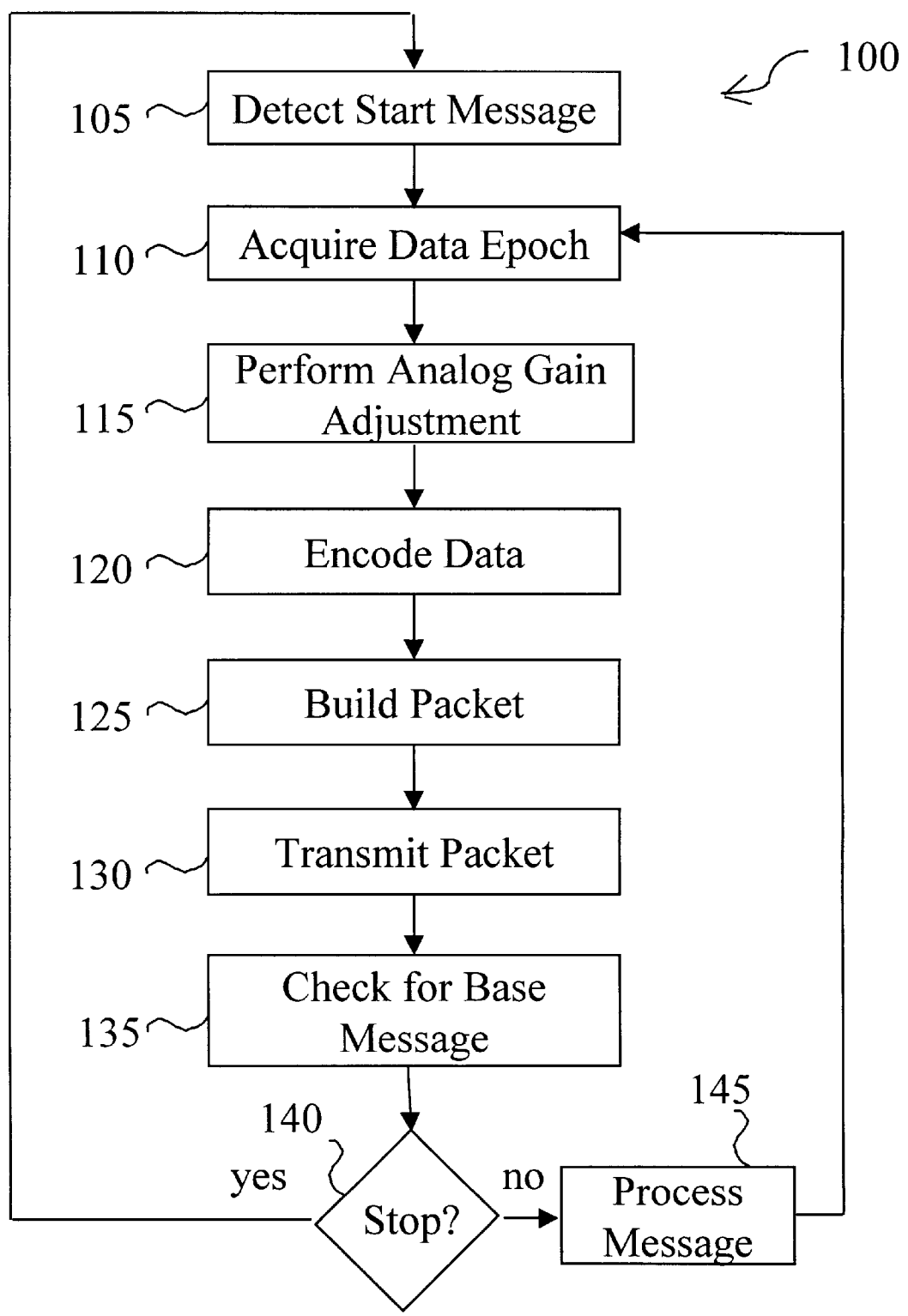
FIG. 5 shows a flowchart of the software operation of a remote processor.

Referring to FIG. 5, the remote processor 22 processes received signals according to a procedure 100. Initially, the remote processor 22 waits for a message from the base station 26 to start processing the received signal (step 105). Once the start message has been received, the remote processor 22 acquires an epoch of 50 milliseconds of digitized signal (step 110). The digitized data is examined to determine the maximum electronic gain that may be applied without saturating the data. The micro-controller 42 then adjusts the electronic gain appropriately (step 115). The electronic gain may be changed from one 50-millisecond epoch to the next. The change in gain may be to the gain setting that utilizes all bits of the A/D converter in representing the minimum and maximum signal values in a 50-millisecond epoch. Alternatively, the change in gain setting may be incremental, for example varying by a factor of either two or one half. In this manner the gain setting tracks changes in the received signal strength more slowly than the rate at which those changes may occur. In situations where the received signal strength is increasing sharply between epochs, the gain adjusts more slowly. Although saturation of the received signal may occur as the gain slowly decreases, an isolated noise spike will not reduce the gain dramatically, which would cause unnecessary attenuation of the received signal.

Maximizing the electronic gain is important since the leak signal may be up to ten thousand times smaller than the noise. The micro-controller 42 then encodes (step 120) the digitized signal, x, using the relation $$g(x) = \text{sgn}(x)\frac{\ln(1 + \mu|x|)}{\ln(1 + \mu)}$$

where g(x) is the encoded signal, sgn(x) is the sign of x (that is, positive or negative), ln represents the natural logarithm, |x| is the absolute (i.e. unsigned) value of x, and $\mu$ is the compression parameter. Such systems of signal encoding have been widely used in telephone electronics to provide lossless compression and expansion of voice waveforms. With x occupying a range of 16 bits and g(x) occupying a range of 8 bits, some loss of precision occurs when g(x) is expanded to recover x. The value of $\mu$ must be selected to minimize this loss at low values of x. Values of $\mu$ between 200 and 400 are suitable. In this case, the loss is immaterial to the process of correlation as it occurs only with large values and hence noisy samples.

Figure 6:
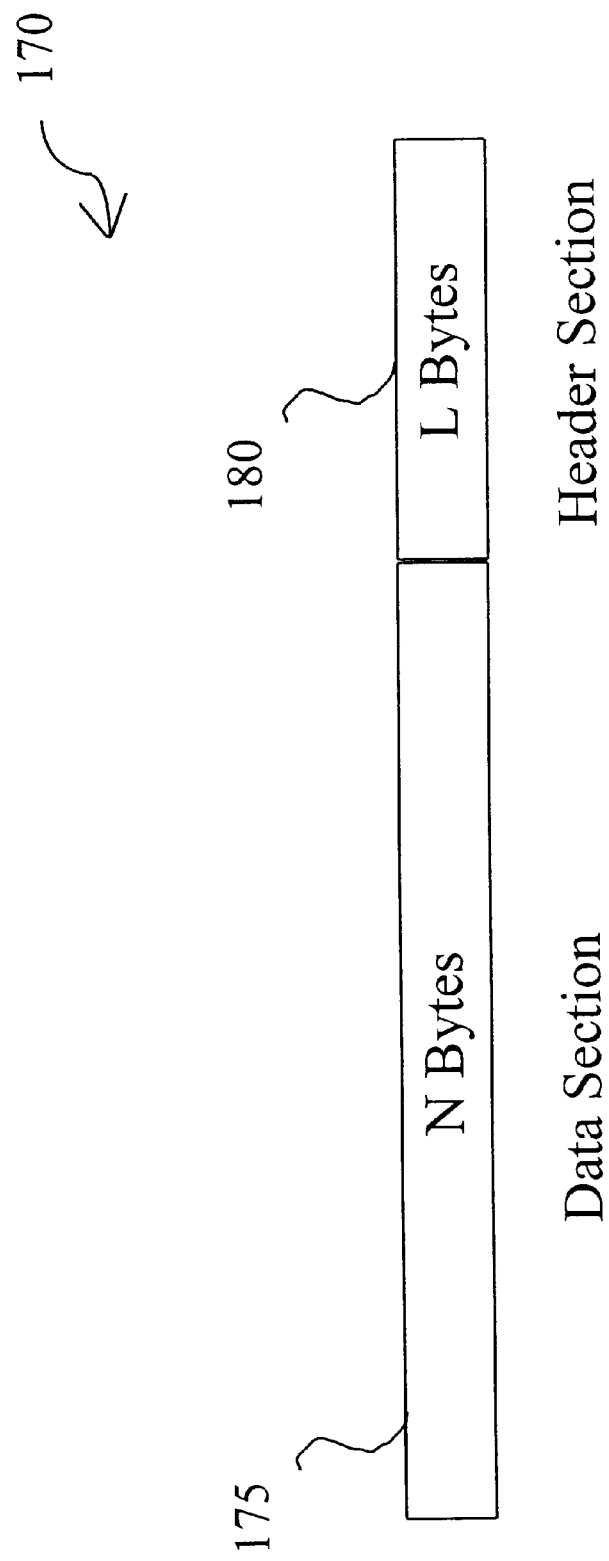
FIG. 6 shows the structure of a data packet.

Encoding reduces the digitized data from samples of 16 bits in length to samples of 8 bits in length. The encoded signal samples in the 50-millisecond epoch then are used to form a data packet 170 (step 125). Referring to FIG. 6, the data packet 170 includes a data section 175 and a header section 180. The data section consists of the encoded, 8-bit data samples and is N bytes long where N is the number of encoded data samples. The header section may include L bytes which numerically represent: the number, N, of data samples in the packet, the electronic gain with which the data samples were acquired, the time of acquisition of the data epoch, the geographical position of the remote processor, and other information. The packet is then output from a serial port of the micro-controller 42, adjusted in voltage level to a transmission protocol such as RS-232, and sent to a digital transceiver 44. Referring again to FIG. 5, the digital transceiver 44 transmits the packet to the base station (step 130). The remote processor then checks to see if a message has been received from the base station (step 135). The message is examined to see if it is a stop message (Step 140). If the message is a stop message then the remote processor 22 stops transmitting data, deactivates the digital transceiver 44, and waits for a new start message (step 105). If no message has been received the remote processor 42 acquires a subsequent data epoch (step 110). If a message other than stop is received, the message is processed (step 145) and then the remote processor 42 acquires a subsequent data epoch (step 110). Other messages received from the base station 26 may include, for example, a command to register the position of the remote processor from the position finder 46, or to adjust the electronic gain to a particular value.

Base Station

Figure 7:
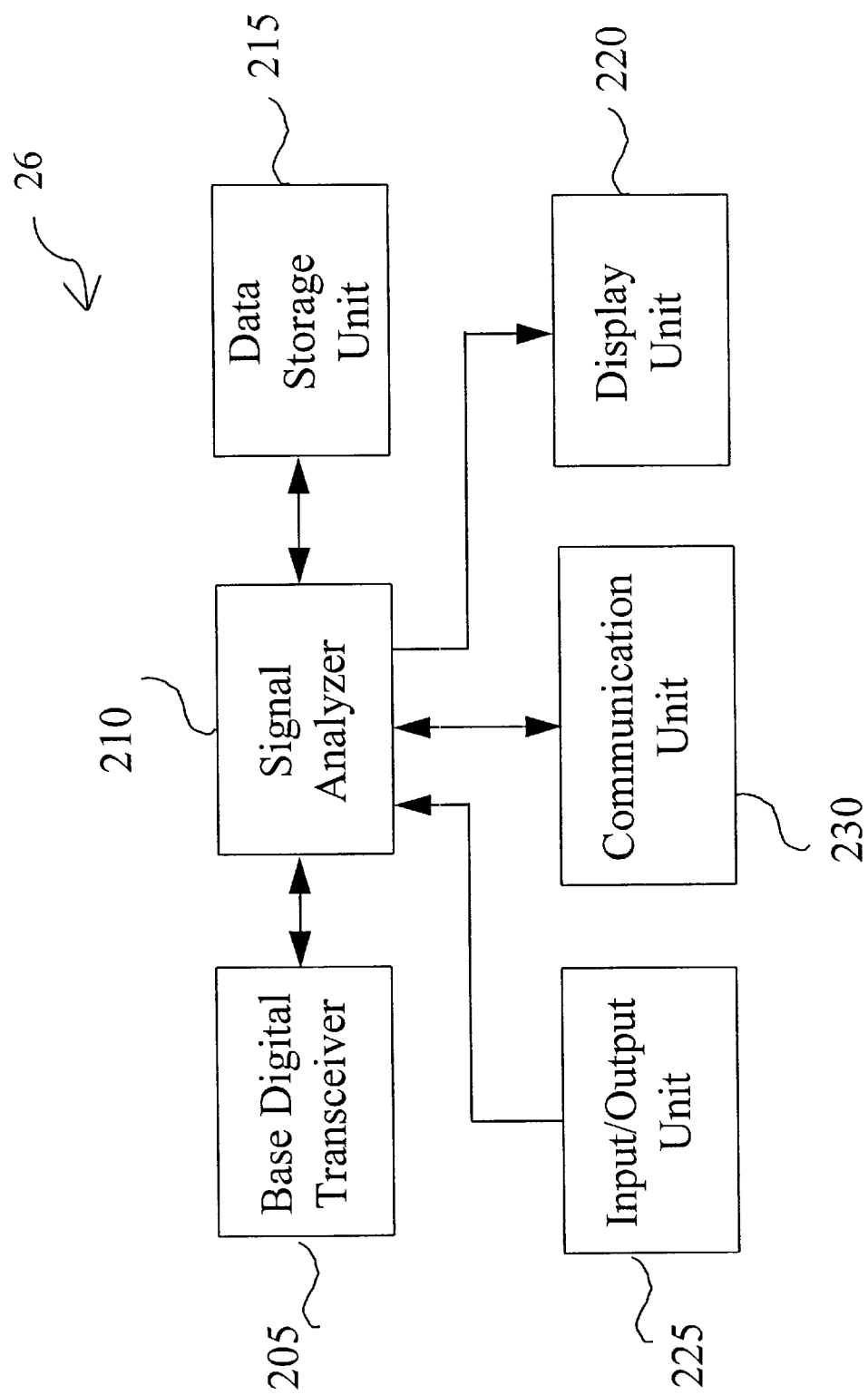
FIG. 7 shows the hardware of the base station.

Referring to FIG. 7, data transmitted by the remote processors is received at the base station 26 by the base digital transceiver 205. The received signals are, output by the base digital transceiver 205 to the signal analyzer 210. The signal analyzer 210 stores data permanently in the data storage unit 215. The signal analyzer 210 decodes the received signals and can display them on the display unit 220. The user at the base station 26 interacts with the base station using the input/output unit 225. This may be a computer keypad, a waterproof membrane push-button pad, or a computer pointing device. A communication unit 230 is optionally provided in order to facilitate communication between the base station and a supervisory station operated by a user at a distant location.

Figure 8:
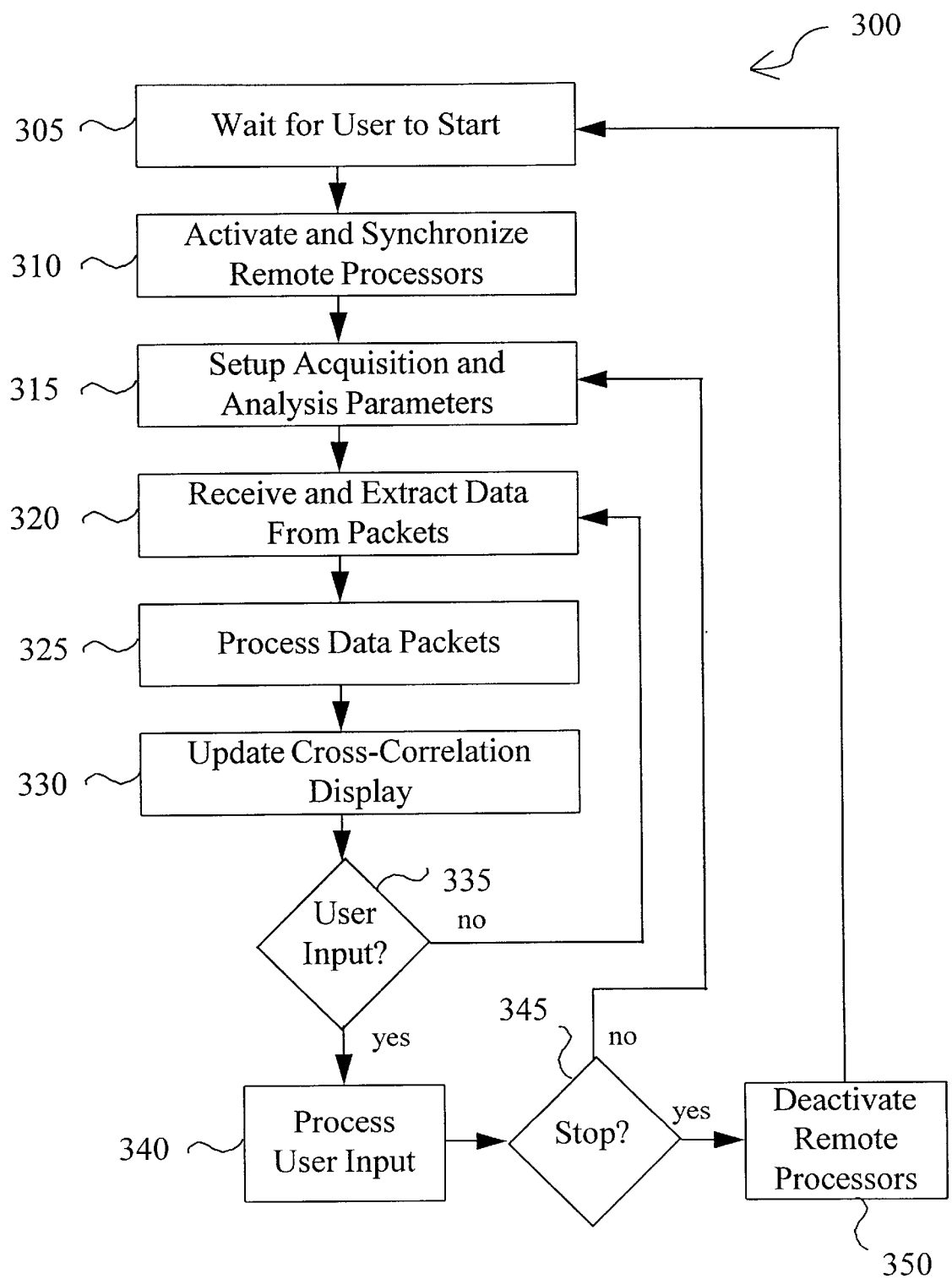
FIG. 8 shows a flowchart of the software operation of the base station.

Referring to FIG. 8, the base station 26 analyzes received data according to a procedure 300. The user issues a start command, either with the input/output unit 225 or with the communication unit 230 (step 305). The base station 26 then sends a message to the remote processors 22, activating and synchronizing the remote processors 22 (step 310). The base station then initializes the acquisition and analysis parameters (step 315). The acquisition and analysis parameters include the electronic gain, the number of remote processors to receive data from, the type of filtering analysis to perform, the type of correlation analysis to perform, and the format of the display. The base station then receives and extracts the data transmitted by the remote processors (step 320). The extraction procedure separates the data packets received from the individual remote processors, extracts the data from the packets, and multiplies the data by the gain factor transmitted with the packet.

Figure 9:
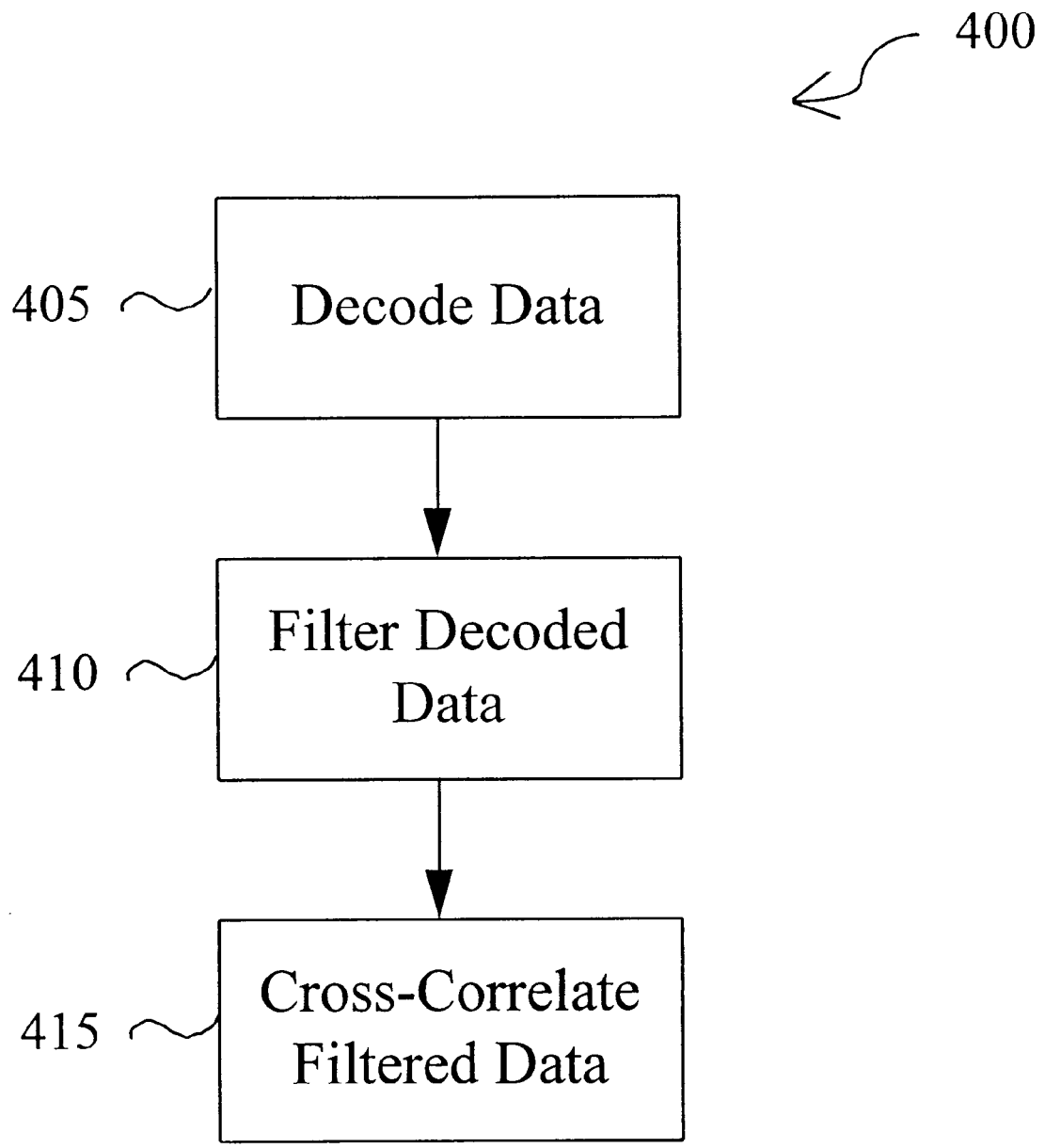
FIG. 9 shows a flowchart of the procedure for processing the received data.
Figure 10:
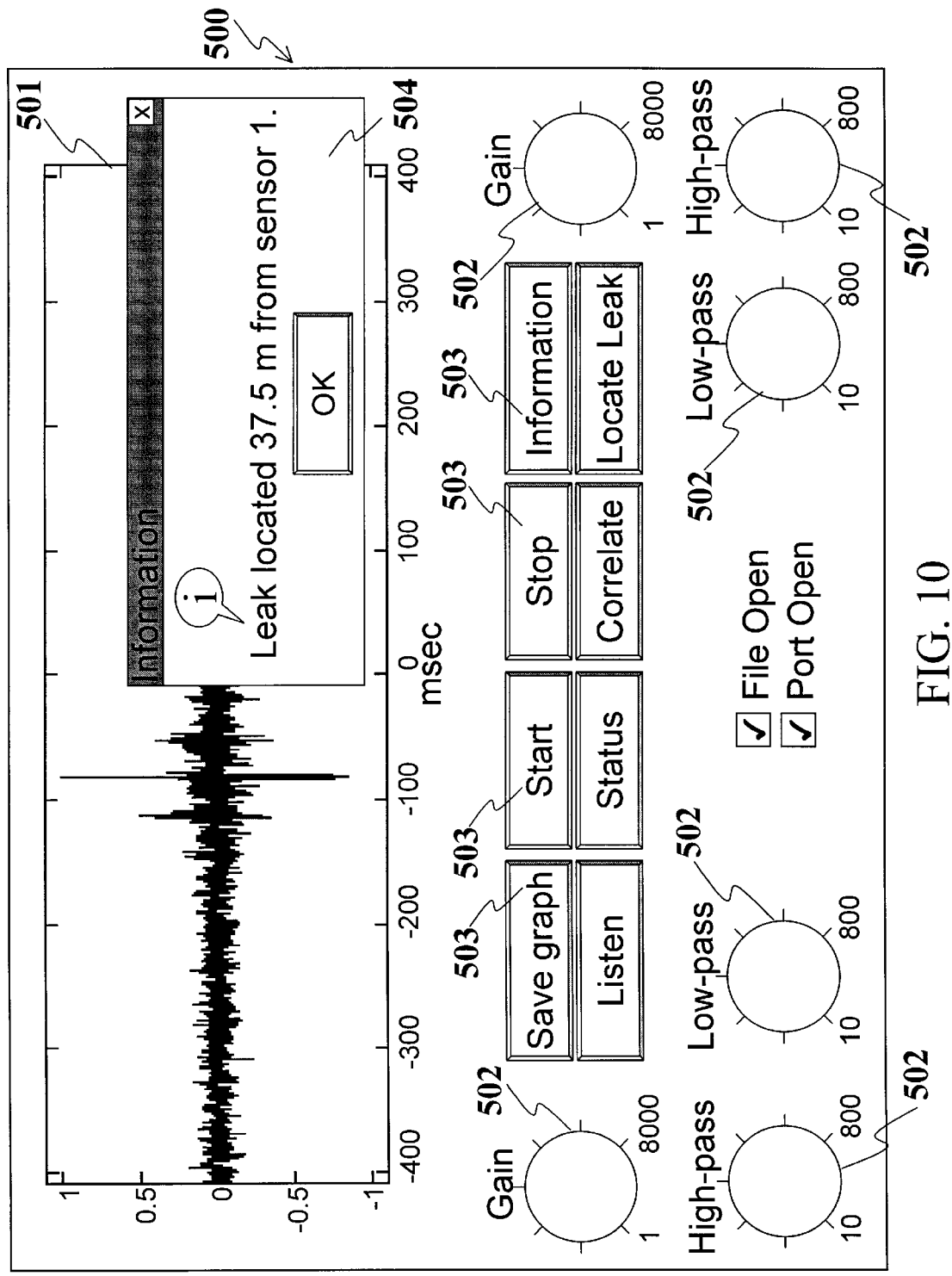
FIG. 10 shows the structure of messages transmitted between the base station and a remote processor.

Referring to FIG. 9, the extracted data is then processed according to a procedure 400. The procedure decodes the data (step 405), filters the decoded data (step 410), and cross-correlates any two sets of filtered data (step 415). Referring again to FIG. 8, the display is then updated (step 330). The graphical part of the display shows the cross-correlation waveform which is updated at regular intervals, typically four times a second. The graphical part of the display may optionally show the decoded data, either filtered or unfiltered, that is input to the correlation procedure. Additionally, either automatically or manually under user control, the time scale and amplitude scale of the graphical part of the display may be adjusted to display the cross-correlation waveform or decoded data more effectively. The aspect ratio (ratio of the vertical to horizontal dimensions) of the graphical part of the display may also be adjusted. Referring to FIG. 10, the base station display 500 includes a graphical window 501, showing the correlation function, user controls 502, user input options 503, and a system dialog box 504.

Referring again to FIG. 8, after updating the display (step 330), the base station checks to see whether there has been any command input from the user (step 335). If there has been no user input, the procedure continues with the receiving of the next data packet (step 320). If there has been a user input, the user input is processed (step 340). The command input is examined to determine whether the data acquisition should stop (step 345). If not, the acquisition and analysis parameters are then adjusted (step 345) and the procedure continues with the receiving of the next data packet (step 320). If the command is to stop the data analysis procedure 300, the base station 26 deactivates the remotes processors 22 (step 355), and resumes waiting for a user start command (step 305).

Referring to FIG. 11, messages sent between the base station 26 to the remote processors 22 are shown in tabulated form. Depending on the specific message, messages may be initiated by the base station 26 or the remote processor 22.

Leak Data Processing

Decoding and Filtering

Referring again to FIG. 9, the extracted data is first decoded using the mathematical inverse of the encoding formula (step 405). The decoded data is then filtered (step 410). The filtering step attenuates the low- and high-frequency parts of the frequency spectrum, thereby enhancing the signal-to-noise ratio of the decoded data. Digital filtering allows very precise and sharp discrimination of frequencies in the frequency spectrum. The digital filters applied to decoded data from each sensor may be perfectly matched, as opposed to analog filters whose characteristics may vary by more than 10% from each other. The digital filters may also have different settings for decoded data from different sensors, allowing better discrimination between signal and noise in the frequency spectrum for decoded data from individual sensors.

The filter is typically an eighth order Bessel bandpass filter, which gives an approximately equal time delay through the filter for all frequencies. The filter may also be of the Butterworth, Chebyshev, or other digital filter design types. The filter cut-off frequencies and orders for the highpass and lowpass sections are user-adjustable analysis parameters.

Simple Cross-Correlation

Figure 12:
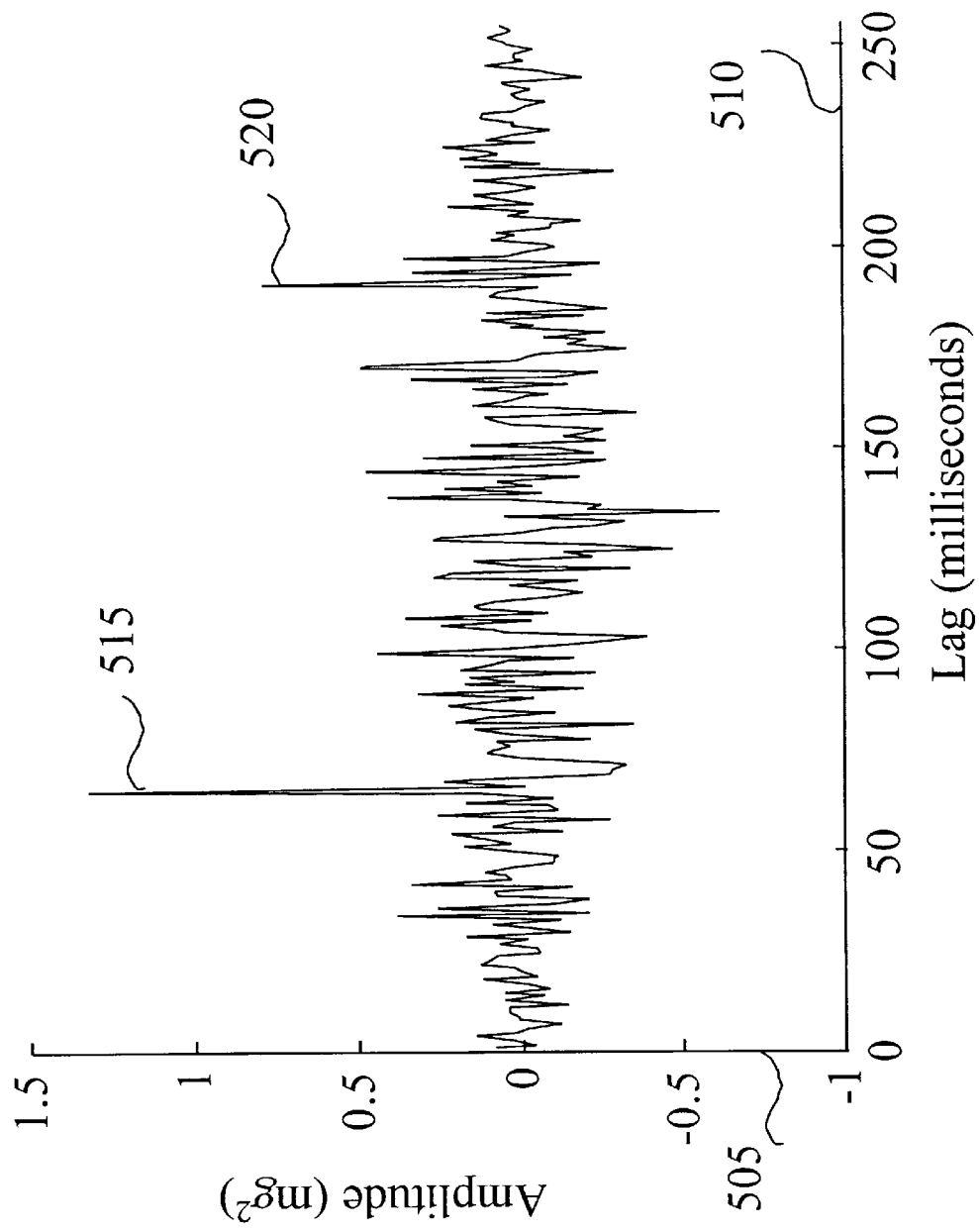
FIG. 12 shows an example of a cross-correlation waveform computed from two sensors, expressed in units of thousandths of gravitational force.

The filtered data from at least two remote processors is then cross-correlated (step 415). The cross-correlation analysis type is a user-adjustable parameter. The simplest form of cross-correlation function, r(m), is defined as $$r(m) = \sum_{k=1}^{K} x(k)y(k+m)$$

where x(k) and y(k) are the data from two remote processors, x and y, respectively, K is the total number of samples received, and m is the lag. The lag is typically computed between ±M, where M is programmable between 512 and 4096 samples, corresponding to lag times of 100 to 800 milliseconds. Referring to FIG. 12, the amplitude of the cross-correlation function is plotted on the vertical axis 505 against the lag, which is plotted on the horizontal axis 510. A major peak 515 occurs at a lag of 64 milliseconds. A second, lesser peak 520 occurs at a lag of 190 milliseconds. These lags represent time differences for which a significant cross-correlation exists between the signals received from the two sensors.

The amplitude of the cross-correlation function is computed in units of squared gravitational force, that is, g's squared. The decoded data is converted from its digitized sample representation using the known transfer function of the sensor (Volts/g) and the electronic gain, which is transmitted in each data packet. The amplitude of the cross-correlation function is proportional to the acceleration of the leak sound against the pipeline at the sensor. The acceleration depends on the strength of the leak signal at the leak and the distance of the leak to the sensors. The position of a leak in the pipeline system relative to one sensor, d, corresponding to the major peak 515, is found from the equation $$d = \frac{D - VT}{2}$$

where D is the distance between the sensors, V is the velocity of sound in the pipeline medium, and T is the time difference, read from the cross-correlation function as the lag value of the peak.

The attenuation of the leak sound in the pipeline as a function of distance, $\epsilon$, can be determined in decibels per meter from the known characteristics of the pipeline (its diameter, pressure, and material). With this information and knowledge of the position of the leak, the strength of the leak signal in g's at the position of the leak, $A_{leak}$, can be easily determined.

$$A_{leak} = A_\rho * 10 \log_{10}(\epsilon d)$$

where $A_\rho$ is the strength of the leak signal measured directly from the cross-correlation function, taken as the square root of the peak value. The strength of the leak signal is proportional to the size of the leak, which can thus be estimated.

The noise present in the cross-correlation function is inversely proportional to the number of samples, K, used in the cross-correlation calculation. Noise is the biggest confounding factor in detecting peaks in the correlation function. It may mask the true peak 515 entirely if the leak signal is small. Noise may also cause artifactual peaks in the correlation function, such as the second peak 520 in FIG. 12.

Unbiased Cross-Correlation

The unbiased cross-correlation function, $r_u(m)$, is defined as $$r_u(m) = \frac{1}{K - m} \sum_{k=1}^{K} x(k) y(k + m)$$

Each lag value now has the same weighting, important if K is not significantly greater than M. Unbiased cross-correlation is useful when very limited amounts of data are available for analysis.

Normalized Cross-Correlation

Figure 13:
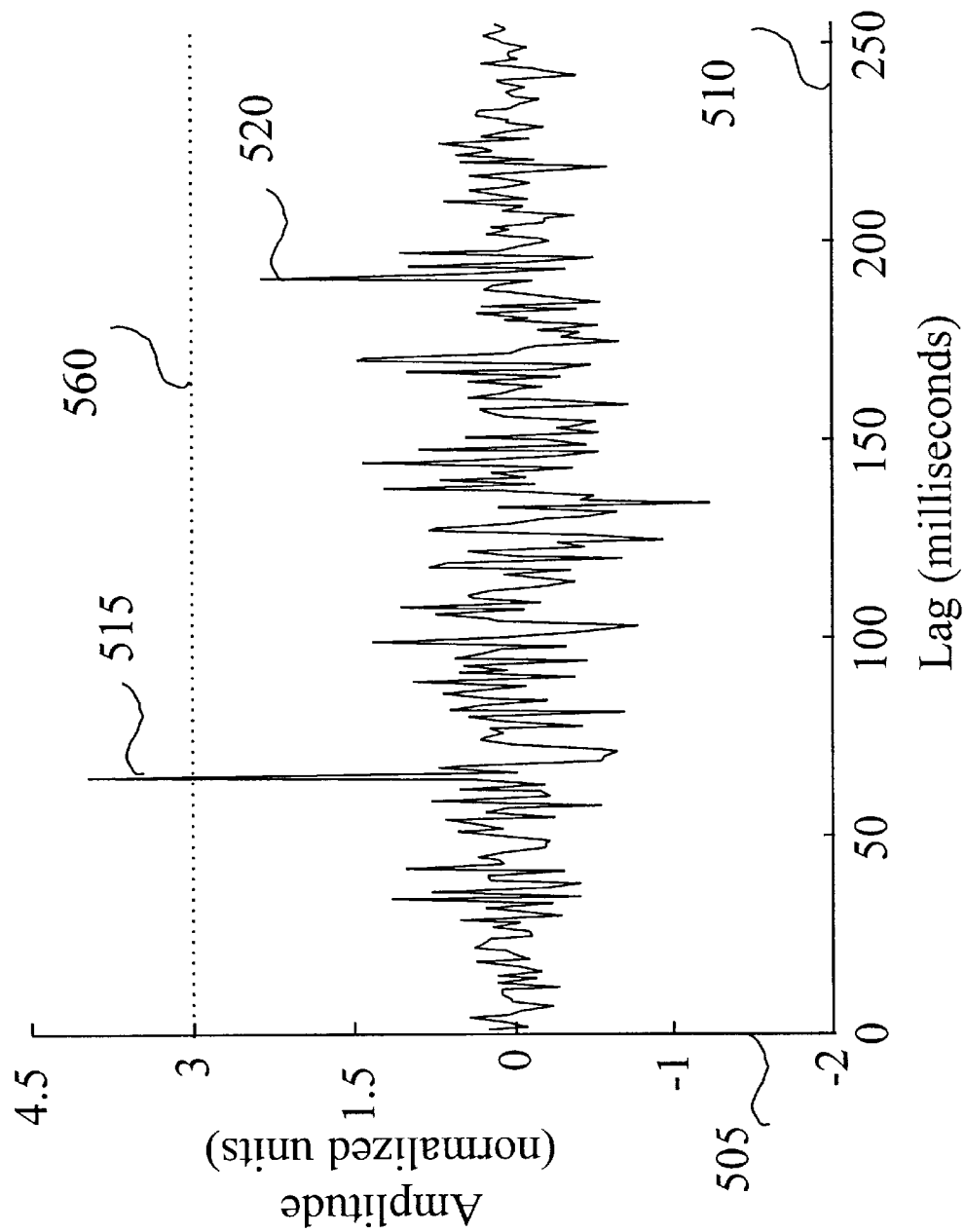
FIG. 13 shows an example of a normalized cross-correlation waveform computed from two sensors.

The normalized cross-correlation function, $\rho(m)$, is defined as $$\rho(m) = \frac{r(m)}{\sqrt{\sum_{k=1}^{K} x^2(k)} \sqrt{\sum_{k=1}^{K} y^2(k + m)}}$$

noting that the use of y(k+m) as opposed to y(k) is unnecessary if K is a lot greater than M. As noted in FIG. 12, a spurious peak 520 can arise in the cross-correlation function. The normalized cross-correlation function provides a method of testing the likelihood that a peak is not a statistical artifact caused by noise but is actually a true correlation. The normalized cross-correlation function has an expected value of zero where there is no correlation. The value of a peak is proportional to the likelihood that the peak represents an actual leak, that is, a signal that is consistent and coherent between the two sensors with a fixed difference in time of arrival at each sensor. Referring to FIG. 13, the normalized cross-correlation function has exactly the same shape as the cross-correlation function but its amplitude is normalized to the amplitudes of the received data. A threshold 560 drawn at a particular value, for example three, can be used to distinguish between a peak 520 that may be due to noise (a peak occurring below the threshold) and a peak due to an actual leak 515 (a peak occurring above the threshold).

A simpler method of normalized cross-correlation is to set r(0)=1. This assumes that there are no leak signals present with a lag of zero between the 2 sensors. That is, if a leak is present then it is not equidistant from the sensors. By this definition, the normalized cross-correlation $\rho(m)$, is given by $$\rho(m) = r(m)/r(0)$$

Incremental Cross-Correlation

The cross-correlation function may also be computed after clipping the input data. That is, if x(k) is positive and is greater than a particular value, A, x(k) is set to equal A. If x(k) is positive and less than A, it is unchanged. If x(k) is negative, it is set to equal –A. If x(k) is negative and greater than A, it is unchanged. In other words, x(k) is constrained to have values between ±A. The procedure is repeated for y(k), using a particular value B. The cross-correlation function (or normalized cross-correlation function) is then computed. Suitable values of A and B may be determined from x(k) and y(k). For example A may be set to be equal to the mean absolute value of x(k) plus one standard deviation of x(k), i.e.

$$A = \sum_{k=1}^{K} |x(k)|/K + \sqrt{\sum_{k=1}^{K} x^2(k)/K - \sum_{k=1}^{K} \left(x(k) - \sum_{k=1}^{K} x(k)/K\right)^2 / K}$$

The value of B may be similarly defined using y(k). Alternatively, the cross-correlation function itself may be clipped. That is, if $\rho(m)$ is outside the range ±C, $\rho(m)$ is constrained to be within the limits ±C.

Incremental cross-correlation offers significant advantages when the leak signal component in x(k) or y(k) is small compared to the noise content. Large variances in x(k) or y(k) can swamp the cross-correlation function by creating large cross products between noisy samples. By limiting the noise cross products, the cross-correlation function, and hence any peaks present, are enhanced.

Figure 14:
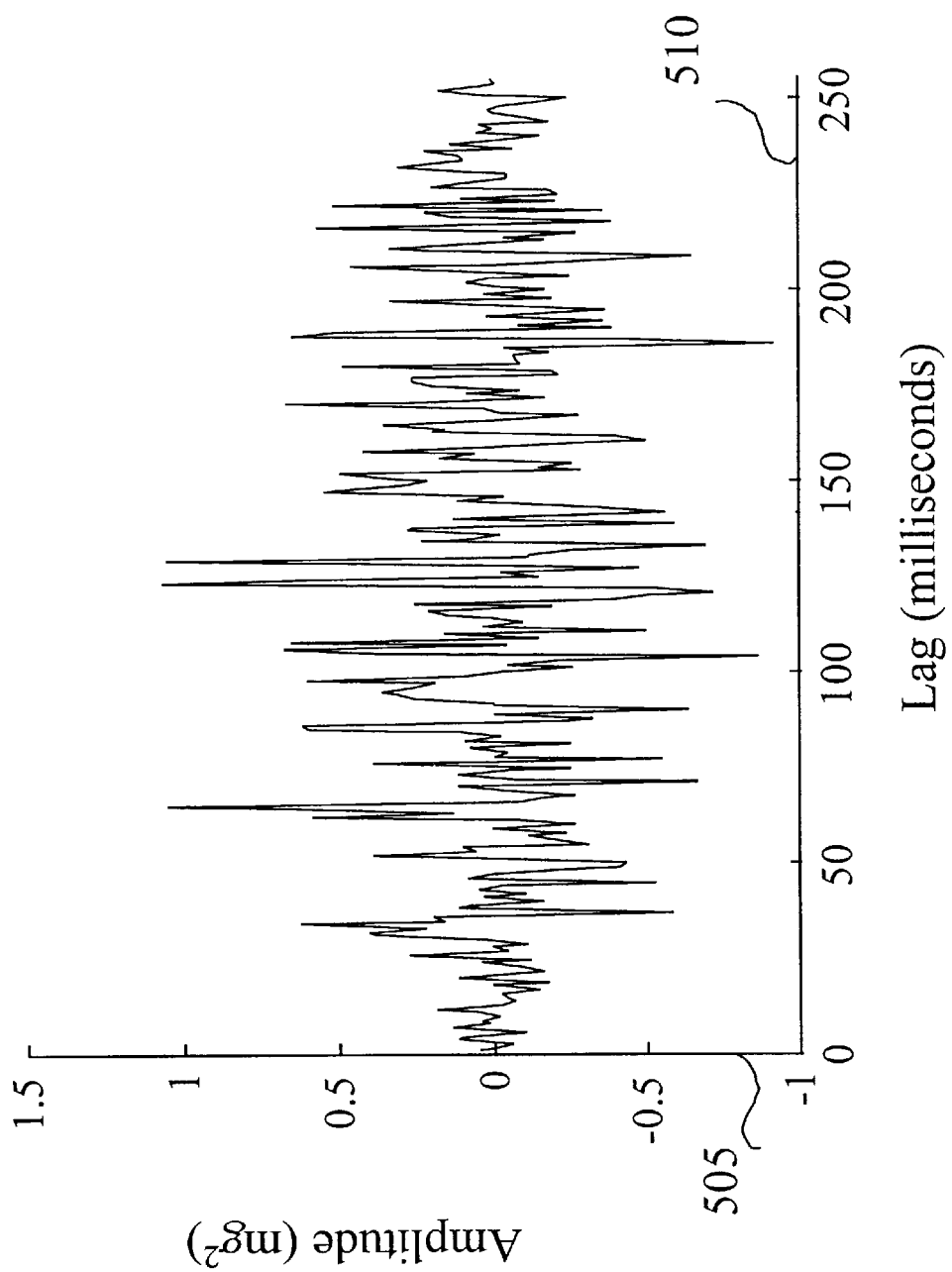
FIG. 14 shows an example of a cross-correlation waveform computed from two sensors and received at a low signal-to-noise ratio.
Figure 15:
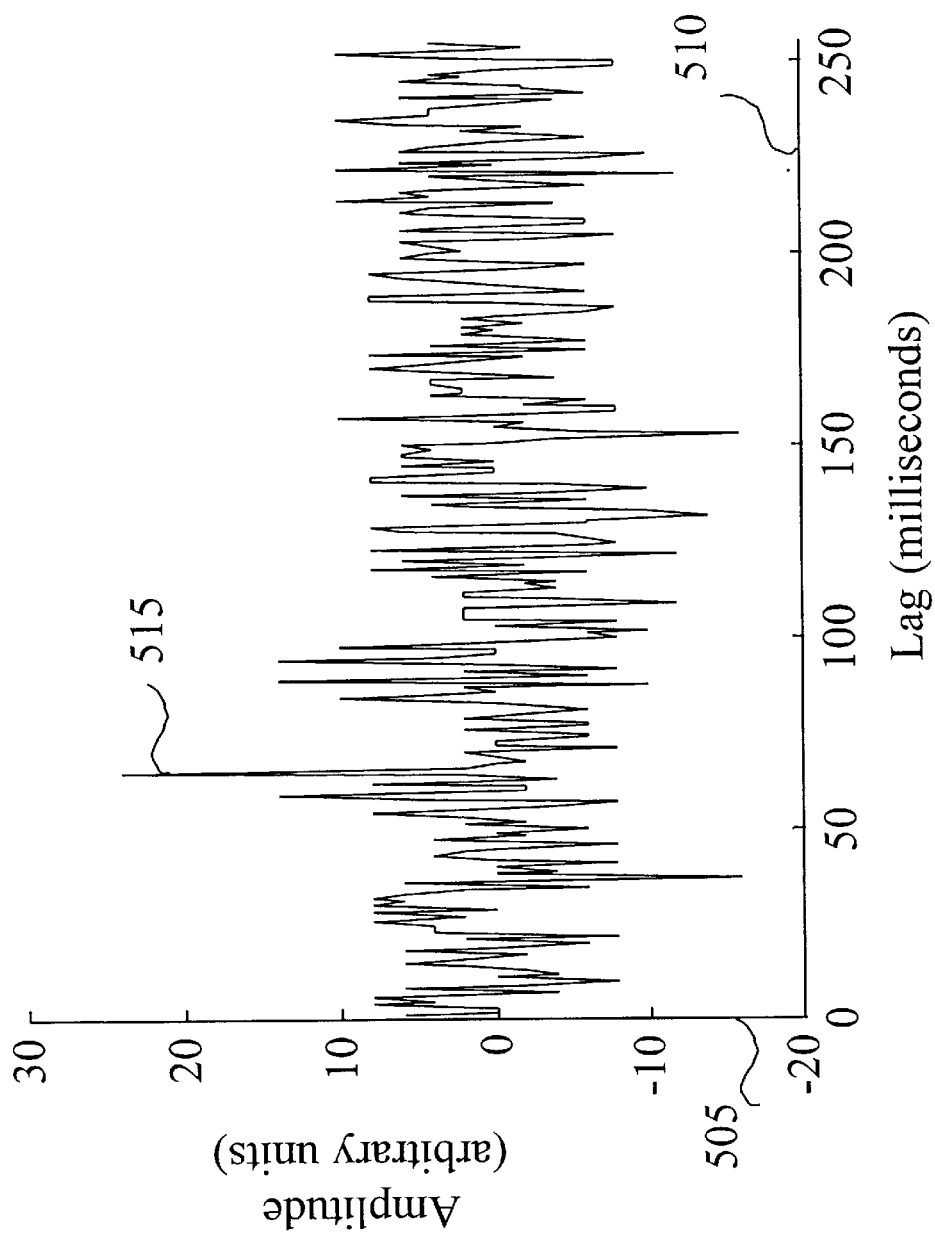
FIG. 15 shows an example of an incremental cross-correlation waveform computed from two sensors and received at a low signal-to-noise ratio.

FIG. 14 shows an unsuccessful conventional cross-correlation analysis. Large quantities of noise and a small leak signal make the peak indistinguishable from the noise in the cross-correlation function. FIG. 15 shows the same data after incremental cross-correlation analysis. The peak 515 is now visible due to the enhanced noise attenuation of the incremental cross-correlation procedure.

Reduced Variance Cross-Correlation

In some cases there are sporadic bursts of noise that can appear in the input data, x(k) and y(k). Noise bursts occur in the ambient noise, with causes such as traffic, trains and machinery. Noise bursts may also occur in the flow noise, with causes such as opening and closing of valves, changed pressure and flow velocity characteristics, or operation of equipment such as pumps. It is advantageous to restrict this noise selectively without resorting to incremental cross-correlation methods. The noise variance in a single 50-ms epoch is measured as $$VAR[x(k)] = \sum_{k=1}^{Q} x^2(k)/Q - \sum_{k=1}^{Q}\left(x(k) - \sum_{k=1}^{Q} x(k)/Q\right)^2 /Q$$

where Q is the number of samples of x(k) in the epoch. The average variance, $\overline{VAR[x(k)]}$, over the entire data duration of K samples is found by averaging the values measured from the individual epochs. Epochs with a variance greater than a particular value, for example more than twice $\overline{VAR[x(k)]}$, are identified before computing the cross-correlation function. The values of x(k) and y(k) are set to zero in these identified epochs. As a result, noisy epochs do not contribute to the cross-correlation function.

Figure 16:
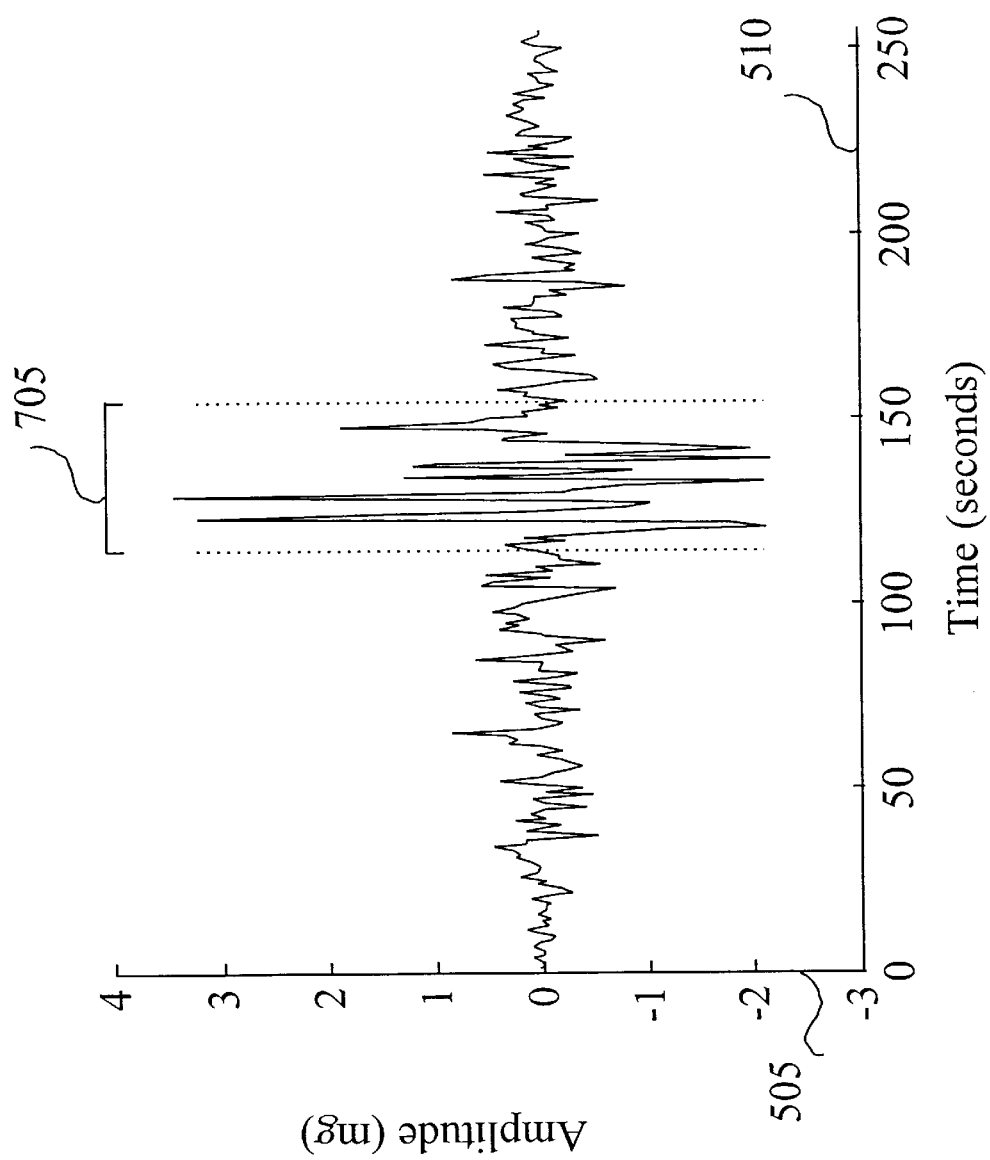
FIG. 16 shows an example of data received from one sensor, with a burst of high-amplitude noise present briefly.

FIG. 16 shows a 250-second sequence of data from one sensor. A burst of high-amplitude noise 705 is present which would corrupt a simple cross-correlation analysis. Reduced variance cross-correlation identifies the period of high-amplitude noise. Data in the excessively noisy period is replaced by zeros. The reduced variance cross-correlation function is then not corrupted by the noisy data and a peak will be detected if present.

Automatic Measurement of the Distance Between Sensors

In conventional leak detectors, the distance between sensors is often measured by walking with a measurement wheel to obtain an odometer reading. This is time-consuming and not possible where access along the pipeline is restricted. Alternatively, the pipe can be impulsed, for example by striking the pipe with a hammer. The time taken for the sound of the impulse to travel through the pipeline between the sensors is estimated by cross-correlating signals received from the sensors. This method is imprecise due to the imperfect nature of the impulse function.

A precisely calibrated measurement of the time taken for sound to travel between sensors through the pipeline is made. The base station sends a control message to a single remote processor to alter its operational mode. That remote processor now generates a random signal function—that is a token signal—using its microprocessor. The token signal is simultaneously transmitted to the base station and applied to the pipeline. This is achieved by converting the digital token signal to an electrical voltage, converting the electrical voltage to a mechanical vibration, and applying the mechanical vibration to the pipeline. The signal received by another remote processor is also transmitted to the base station. Cross-correlation of the two transmitted signals is used to estimate the time taken for the token signal to travel through the pipeline between the sensors. The statistics of the token signal, namely its precise starting time and its random nature (implying a flat broadband frequency spectrum), enable a highly accurate measurement of the velocity of acoustic propagation through the pipeline at all frequencies.

Repetitive Analysis

Conventional leak detectors have no means of re-analyzing data used to compute a cross-correlation function. Referring to FIG. 7, data stored in the data storage unit 215 may be subsequently re-analyzed to improve the leak detection procedure. In one approach, the same transmitted signal data is analyzed with different filter settings. This permits multiple attempts to enhance a suspected but indistinct peak in the cross-correlation function. The cross-correlation functions resulting from applying different filters can be displayed together, allowing assessment of the frequency-dependent characteristics of the peak. Alternatively, different methods of cross-correlation may be performed and compared. For example, an analysis by simple cross-correlation and by reduced variance cross-correlation may be jointly assessed to determine whether a suspected peak in the cross-correlation waveform is a product of transient noise.

Repetitive analysis also permits the reproducibility of the cross-correlation result to be assessed. With one approach, data from successive, separate leak detection studies are stored in the data storage unit 215. A filtering and cross-correlation analysis strategy is determined as described above. Once the cross-correlation waveform has been obtained for one leak detection study, other studies may be processed similarly. The resulting cross-correlation waveforms from the separate studies may be displayed together, permitting an assessment of the reproducibility of the cross-correlation result.

Supervised Control By Communication With a User at a Distant Location

Referring again to FIG. 7, the base station may optionally include a communication unit 230. The communication unit 230 allows a user at a distant control site to perform the leak detection procedure and analyze the result. The communication unit 230 provides a link by a radio modem at the base station 26. Received data from the sensors, the cross-correlation function, and control messages are transmitted to a supervisory station at a distant location. The user at the distant supervisory station is able to control the base station in a similar manner to a user at the pipeline. Commands normally issued by a user at the base station 26 are instead received by the base station from a user at the supervisory station via the radio modem. One supervisory station may simultaneously be in communication with several base stations. Remote leak detection studies may be supervised over great geographical distances.

Other embodiments are within the scope of the following claims.

What is claimed is:

1. A method for detecting a leak in a pipeline, the method comprising:

applying sensors to the pipeline to receive acoustic signals;

processing the received signals with processors associated with the sensors to produce digital signals representative of the received signals, each of the digital signals including a sequence of digital samples, and the processing of a received signal including amplifying the received signal using a gain;

periodically adjusting the gain used to process a received acoustic signal to control a resolution of the corresponding digital signal relative to the received acoustic signal;

issuing a synchronization command to the processors associated with the sensors from a base station, the synchronization command temporally aligning processing of the received signals between the processors;

transmitting the digital signals to the base station, the base station being located remotely from the processors, and the transmitting of a digital signal including:

transmitting a set of digital samples associated with a time period of the digital signal, the digital samples all resulting from using a particular gain to amplify a received acoustic signal, and transmitting with the set of digital samples information identifying the particular gain and a time associated with the set of digital samples; and analyzing the transmitted signals for two or more sensors at the base station to obtain measures of any leaks present in the pipeline, the analyzing of a set of digital samples using the information identifying the particular gain and time associated with the set of digital samples.

2. The method of claim 1 wherein applying a sensor includes applying an integrated, electronic accelerometer sensor, whereby sensing is enabled from pipeline locations with limited space for access.

3. The method of claim 1 wherein the processing step includes encoding the received signal to a reduced digital representation, whereby the dynamic range of the received signal is largely preserved in a data representation with a reduced number of bits.

4. The method of claim 1 wherein the processing step includes forming digital packets from the received signals, a digital packet including a set of digital samples all produced using a particular gain and information identifying the particular gain and the time associated with the set of digital samples.

5. The method of claim 4 wherein the information identifying the particular gain includes a digital representation of the particular gain.

6. The method of claim 1 wherein:

the processing step includes
using a particular gain to amplify the received signal, and
generating digital data samples corresponding to the amplified signal, and the adjusting step includes automatically adjusting the particular gain by analyzing the digital data samples, whereby the resolution of the received signal is maximized.

7. The method of claim 1 wherein the processing step includes determining positions of the processors with automatic position finding units using satellite or radio signals.

8. The method of claim 7, further comprising transmitting the position of a processor to the base station in conjunction with a signal processed by that processor.

9. The method of claim 1 wherein the transmitting step includes two-way communication between the base station and the processors, whereby transmission of control messages between the base station and the processors is enabled.

10. The method of claim 1 wherein the analyzing step includes applying digital filters to the transmitted signals, and computing a cross-correlation function after applying the digital filters, whereby the signal-to-noise ratio of the transmitted signals is enhanced.

11. The method of claim 10 wherein digital filters with different characteristics may be applied different ones of signals to the transmitted signals, whereby the signal-to-noise ratio is individually improved for each transmitted signal.

12. The method of claim 3 wherein the analyzing step includes:

decoding digital samples of a received signal to produce expanded digital samples;

adjusting the amplitude of each expanded digital sample using transmitted information identifying the particular gain associated with the digital sample;

transforming the expanded digital samples to units of gravitational acceleration; and computing a cross-correlation function expressed in units of gravitational acceleration, whereby an estimate of the strength of the leak signal can be obtained.

13. The method of claim 1 wherein the analyzing step further includes repetitive analysis of the transmitted signals received at the base station comprising:

storing the transmitted signals at the base station;

computing a cross-correlation function using the stored signals;

varying one or more computational parameters used to compute the cross-correlation function;

repeating computation of the cross-correlation function using the stored signals and the varied computational parameters; and assessing the computed cross-correlation functions, whereby the assessment of the approximate location of any leaks present in the pipeline is improved.

14. The method of claim 13 wherein the analyzing step includes applying digital filters to the transmitted signals, and the parameter varied is a setting of a digital filter.

15. The method of claim 13 wherein the analyzing step includes flexibly displaying one or more computed cross-correlation functions, whereby the cross-correlation functions can be examined at different time scales, amplitude scales, and aspect ratios.

16. The method of claim 1 wherein the analyzing step includes use of a normalized cross-correlation function comprising:

computing the normalized cross-correlation function; and assessing the likelihood that a peak in the normalized cross-correlation function represents a leak by comparing the value of the peak of the normalized cross-correlation function with a predetermined threshold value.

17. The method of claim 1 wherein the analyzing step includes use of an unbiased cross-correlation function.

18. The method of claim 1 wherein the analyzing step includes use of an incremental cross-correlation function.

19. The method of claim 1 wherein the analyzing step includes use of a reduced variance cross-correlation function comprising:

identifying epochs in the received signals where noise is excessive;

modifying the transmitted signals for epochs where noise is excessive; and computing the cross-correlation function after modifying the transmitted signals for epochs where noise is excessive.

20. The method of claim 1 further including assessment of any leaks in the pipeline at a supervisory station comprising:

establishing a communication link between a base station and a supervisory station;

sending data from the base station to the supervisory station; and assessing data at the supervisory station, whereby an assessment of any leaks present in the pipeline may be made.

21. The method of claim 1, wherein the synchronization command sets a timer in each processor to a known value.

22. The method of claim 21, wherein the synchronization command causes the processors to begin processing of the received signals.

23. The method of claim 1, wherein adjusting the gain comprises adjusting the gain upon expiration of a fixed time period.

24. The method of claim 23, further comprising controlling the fixed time period with a command from the base station.

25. The method of claim 1, further comprising, at the base station, ordering different sets of digital samples based on information identifying times associated with the sets of digital samples.

26. A method for detecting a leak in a pipeline, the method comprising:

applying sensors to the pipeline to receive acoustic signals;

processing the received signals with processors associated with the sensors to produce digital signals representative of the received signals, each of the digital signals including a sequence of digital samples, and the processing of a received signal including amplifying the received signal using a gain;

periodically adjusting the gain used to process a received acoustic signal to control a resolution of the corresponding digital signal relative to the received acoustic signal;

transmitting the digital signals to the base station, the base station being located remotely from the processors, and the transmitting of a digital signal including:

transmitting a set of digital samples, the digital samples all resulting from using a particular gain to amplify a received acoustic signal, and transmitting with the set of digital samples information identifying the particular gain associated with the set of digital samples; and analyzing the transmitted signals for two or more sensors at the base station to obtain measures of any leaks present in the pipeline, the analyzing of a set of digital samples using the information identifying the particular gain associated with the set of digital samples.

27. A method for detecting a leak in a pipeline, the method comprising:

applying sensors to the pipeline to receive acoustic signals;

processing the received signals with processors;

transmitting the processed signals digitally to a base station; and analyzing the transmitted signals for two or more sensors at the base station to obtain measures of any leaks present in the pipeline, wherein the analyzing step further includes estimating a distance through the pipeline between sensors by:

transmitting a control message from the base station to one processor to instruct the processor to generate a token signal;

generating a token signal, vibrating the pipe with the token signal from one processor, and simultaneously transmitting the token signal from said processor;

transmitting the acoustic signal received at one or more other processors;

computing an approximate measure of the time difference in the transmitted signals at the base station; and obtaining an approximate measure of the distance between the sensors by analyzing the measured time difference in reception of the token signal at two processors.

* * * * *